United States Patent
Van Hemelrijck et al.

(10) Patent No.: US 11,479,639 B2
(45) Date of Patent: *Oct. 25, 2022

(54) PROCESS FOR PREPARING A FLUID CONDUIT

(71) Applicant: DSM IP Assets B.V., Heerlen (NL)

(72) Inventors: Ellen Van Hemelrijck, Echt (NL); Marco Van Moll, Echt (NL); Michel Baseotto, Echt (NL)

(73) Assignee: DSM IP ASSETS B.V., Heerlen (NL)

(*) Notice: Subject to any disclaimer, the term of this patent is extended or adjusted under 35 U.S.C. 154(b) by 562 days.

This patent is subject to a terminal disclaimer.

(21) Appl. No.: 16/318,792

(22) PCT Filed: Jul. 11, 2017

(86) PCT No.: PCT/EP2017/067344
§ 371 (c)(1),
(2) Date: Jan. 18, 2019

(87) PCT Pub. No.: WO2018/015205
PCT Pub. Date: Jan. 25, 2018

(65) Prior Publication Data
US 2020/0181320 A1 Jun. 11, 2020

(30) Foreign Application Priority Data

Jul. 21, 2016 (EP) .................. 16180533

(51) Int. Cl.
| | | |
|---|---|---|
| *C08G 63/64* | (2006.01) | |
| *B29C 49/00* | (2006.01) | |
| *B29C 49/04* | (2006.01) | |
| *C08G 63/46* | (2006.01) | |
| *C08G 81/00* | (2006.01) | |
| *C08J 5/00* | (2006.01) | |
| *F02M 35/10* | (2006.01) | |
| *F16L 11/04* | (2006.01) | |
| *B29K 67/00* | (2006.01) | |
| *B29L 23/00* | (2006.01) | |

(52) U.S. Cl.
CPC .......... *C08G 63/64* (2013.01); *B29C 49/0005* (2013.01); *B29C 49/04* (2013.01); *C08G 63/46* (2013.01); *C08G 81/00* (2013.01); *C08J 5/00* (2013.01); *F02M 35/10321* (2013.01); *F16L 11/04* (2013.01); *B29K 2067/006* (2013.01); *B29L 2023/00* (2013.01); *C08G 2120/00* (2013.01); *C08J 2367/02* (2013.01); *C08J 2369/00* (2013.01)

(58) Field of Classification Search
CPC .......... B29C 49/0005; B29C 49/04; B29K 2067/006; B29L 2023/00; C08G 2120/00; C08G 63/46; C08G 63/64; C08G 81/00; C08J 2300/26; C08J 2353/00; C08J 2367/02; C08J 2369/00; C08J 5/00; C08L 75/04; C08L 77/12; F02M 35/10321; F16L 11/04
See application file for complete search history.

(56) References Cited

U.S. PATENT DOCUMENTS

| | | | |
|---|---|---|---|
| 5,914,386 A | 6/1999 | Berendse et al. | |
| 7,973,124 B2 | 7/2011 | Maruyama et al. | |
| 10,865,273 B2 * | 12/2020 | Van Hemelrijck | ........................ B29C 49/0015 |
| 2009/0203871 A1 | 8/2009 | Maruyama et al. | |
| 2011/0003103 A1 | 1/2011 | Aussems et al. | |
| 2011/0057363 A1 | 3/2011 | Leboeuf | |
| 2020/0181320 A1 * | 6/2020 | Van Hemelrijck | ........................ F02M 35/10321 |
| 2021/0061949 A1 * | 3/2021 | Van Hemelrijck | .... C08G 63/64 |

FOREIGN PATENT DOCUMENTS

| | | |
|---|---|---|
| CN | 102105286 | 6/2011 |
| EP | 1 267 112 | 12/2002 |
| EP | 2 325 257 | 5/2011 |
| JP | 2011-94000 | 5/2011 |
| JP | 2011094000 | * 12/2011 |
| JP | 2012-501868 | 1/2012 |

(Continued)

OTHER PUBLICATIONS

S.L. Belcher "Blow Molding", Applied Plastics Engineering Handbook, 2011, Elsevier Inc. (Year: 2011).*

(Continued)

*Primary Examiner* — Frances Tischler
*Assistant Examiner* — Gennadiy Mesh
(74) *Attorney, Agent, or Firm* — Nixon & Vanderhye P.C.

(57) ABSTRACT

Processes for making a fluid conduits and fluid conduits made thereby are disclosed. The fluid conduits include a mono-layer formed of at least 80 wt %, based on total weight of the mono-layer, of a thermoplastic elastomer in an amount of at least 80 wt % with respect to the total weight of the mono-layer. The thermoplastic elastomer is preferably a block copolymer elastomer formed of hard segments (e.g., polyesters, polyamides and/or polyurethanes) and soft segments (e.g., aliphatic polyethers, aliphatic polyesters and/or aliphatic polycarbonates) and exhibits a melt flow rate measured at 230° C. under a load of 10 kg (MFR 230° C./10 kg), according to ISO1133 (2011) of at most 40 g/10 min and having a heat resistance of at least 250 hours at 175° C. at which the elongation at break remains at least 100% as measured according to ISO 527 with a test speed of 50 mm/min.

7 Claims, No Drawings

(56) References Cited

FOREIGN PATENT DOCUMENTS

JP    2015-21051    2/2015

OTHER PUBLICATIONS

International Search Report and Written Opinion of the ISA for PCT/EP2017/067344, dated Sep. 11, 2017, 17 pages.
Finne, "Press Release New high temperature resistant Arnitel TPE from DSM replaces plastics-rubber and metal-rubber combinations in hot air ducts", DSM Press Release, Singapore, Jun. 21, 2016, 3 pages.

\* cited by examiner

PROCESS FOR PREPARING A FLUID CONDUIT

CROSS-REFERENCE TO RELATED APPLICATIONS

This application is the U.S. national phase of International Application No. PCT/EP2017/067344 filed 11 Jul. 2017, which designated the U.S. and claims priority to EP Patent Application No. 16180533.8 filed 21 Jul. 2016, the entire contents of each of which are hereby incorporated by reference.

FIELD

This invention relates to a process for preparing a fluid conduit, as well as fluid conduits itself. Fluid conduits are parts in a car, which may require resistance against heat, either from the inside, as may for example be the case for hot charge air ducts, or from the outside environment, such as for example may be the case for clean air ducts. The choice of material from which the conduit is made is therefore critical, since the conduit should not only fulfil performance requirements regarding e.g. burst-pressure and deformation at elevated operating temperatures, but the conduit should also show good flexibility to allow easy handling and assembling at lower temperatures, especially at room temperature. In addition, its chemical resistance to for example typical automotive fluids and oils needs to be high. Within the automobile industry there is a continuing development towards higher temperatures being used in and near the engine. Also within the air- and fuel-control system this trend is apparent. Normal operating temperatures, for example, in an air-duct are nowadays in the range of 120-140° C., but are moving towards 140-170° C., with peak temperatures reaching 180° C. or above. This is especially the case in so-called turbocharger-ducts that are used in diesel and gasoline engines, where operating temperatures could even exceed 160° C. in the near future. Fluid conduit as known in the prior art often cannot withstand these high temperatures.

BACKGROUND AND SUMMARY

In order to reduce weight, mono-layer air ducts have been developed, such as for example described in EP1267112. EP1267112 describes flexible fluid conduits comprising a mono-layer of a semi-crystalline thermoplastic material having a hardness of between 50 and 65 Shore D and a modulus at 150° C. of at least 60 MPa. A disadvantage of these conduits, however, is that they do not withstand long term high temperatures.

It is thus an object of the present invention to provide a process for preparing a mono-layer fluid conduit, which are able to withstand high heat for a longer period with retention of necessary mechanical properties such as elongation at break, while retaining the required flexibility. This object has been achieved by a process for preparing a fluid conduit comprising a mono-layer comprising a thermoplastic elastomer in an amount of at least 80 wt % with respect to the total weight of the mono-layer, comprising at least the following steps:
 a. Melting a composition comprising at least a thermoplastic elastomer having a melt flow rate measured at 230° C. under a load of 10 kg (MFR 230° C./10 kg), according to ISO1133 (2011) of at most 40 g/10 min and having a heat resistance of at least 250 hours at 175° C. at which the elongation at break remains at least 100% as measured according to ISO 527 with a test speed of 50 mm/min;
 b. Forming a parison from the melt;
 c. Placing the parsion in a mold;
 d. Blow-up the parison against the mold;
 e. Cooling down the mold, thereby obtaining the fluid conduit comprising the mono-layer.

The inventors surprisingly have found that this process provides a fluid conduit that can withstand high heat for longer periods, while retaining flexibility. This has been exemplified by examples.

DETAILED DESCRIPTION

The process according to the invention comprises at least the following steps:
 a. Melting a composition;
 b. Forming a parison from the melt;
 c. Placing the parsion in a mold;
 d. Blow-up the parison against the mold;
 e. Cooling down the mold, thereby obtaining the fluid conduit comprising the mono-layer.

This process is also referred to as blow molding technique, and includes suction blow-moulding and sequential blow-moulding, each optionally with tube manipulation to produce more complex 3-dimensionally shaped conduits.

During blow molding in a first step a molten preform, often a tube-like piece of molten plastic, called parison, is formed. The parison is then placed in a mold and blown-up with gas, preferably compressed air, against the cool wall of the mold to cool down into the end product. Placing the parison in a mold may be performed by clamping or by suction blow molding. With suction blow molding the parison is placed in a mold by drawing the parison through the mold by reduced pressure.

Preferably suction blow molding is used. In that case the parison is placed in the mold via suction with reduced pressure and subsequently the parison is blown with compressed air against the cool wall of the mold. With suction blow molding the amount of waste polymer is reduced. A problem that occurs during the blow molding is that during the preparation of the parison and its handling, the parison sags under its own weight and it is not possible to produce a product out of it any more.

In a preferred embodiment the thermoplastic elastomer in the process according to the invention is a block copolymer elastomer comprising a polyester as hard segment and a soft segment being an aliphatic polycarbonate which aliphatic polycarbonate is made up of repeating units from at least one alkylene carbonate represented by the formula:

(form. 1)

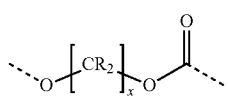

where R=H and/or alkyl.
X=2-20; and more preferred where R=H, most preferred wherein R=H and X=6.

In a preferred embodiment according to the invention, the thermoplastic elastomer has an MFR measured at 230° C. under a load of 10 kg (MFR 230° C./10 kg), according to ISO1133 (2011) of at most 30 g/10 min, more preferably at most 25 g/10 min, as this facilitates the blow molding process.

Within the present application a fluid conduit is understood to include various means for conveying a fluid, such as air or liquids, at for example absolute pressures of about 70-500 kPa, and thus includes hot and cold charge air ducts and clean air ducts. Blow molded fluid conduit can be distinguished from injection molded fluid conduits in that the wall thicknesses of a blow molded conduit shows a much higher variation as compared to an injection molded conduit.

In another embodiment, the fluid conduit is a hot charge air duct or a clean air duct, as these ducts nowadays have to be able to withstand higher temperatures.

The invention also relates to a fluid conduit comprising a mono-layer comprising a thermoplastic elastomer in an amount of at least 80 wt % with respect to the total weight of the mono-layer, wherein the fluid conduit has a heat resistance of at least 250 hours at 175° C. at which the elongation at break remains at least 100% as measured according to ISO 527 with a test speed of 50 mm/min and wherein the thermoplastic elastomer has a melt flow rate (MFR) measured at 230° C. under a load of 10 kg (MFR 230° C./10 kg), according to ISO1133 (2011) of at most 40 g/10 min.

Within the context of the present invention the fluid conduit comprises a mono-layer comprising a thermoplastic elastomer in an amount of at least 80 wt % with respect to the total weight of the mono-layer. This mono-layer provides the conduit its mechanical properties. The conduit may further comprise other layers, which do not or virtually not contribute to mechanical properties of the conduit; like a coating layer for aesthetic or protective purposes. Preferably, the fluid conduit comprises a mono-layer comprising a thermoplastic elastomer in an amount of at least 85 wt % with respect to the total weight of the mono-layer, more preferably at least 90 wt % and even more preferred at least 95 wt %. The fluid conduit may also comprise a mono-layer consisting of a thermoplastic elastomer, thus in an amount of 100 wt % with respect to the total weight of the mono-layer.

The thermoplastic elastomer has a heat resistance of at least 250 hours at 175° C. at which the elongation at break remains at least 100% as measured according to ISO 527 with a test speed of 50 mm/min. Heat-resistance is an intrinsic property of the thermoplastic elastomer and can be easily determined by routine experiment by punching a tensile bar (type 1BA) from an injection molded plate made from the thermoplastic elastomer perpendicular at the flow direction.

Heat resistance is hereby defined as the time at 175° C. until which the elongation at break of a tensile bar (type 1BA) remains at least 100%. The elongation at break of the tensile bar is measured according to ISO 527 with a test speed of 50 mm/min (150527-2/1BA/50).

Preferably, the heat resistance at 175° C. is at least 1000 hr, more preferably at least 2000 hr and even more preferred at least 2500 hr. For a fluid conduit the heat resistance is determined by a tensile bar (type 1BA) cut from a fluid conduit and performing the measurement as described above.

Preferably, the thermoplastic elastomer in the process according to the invention and in the mono-layer of the fluid conduit according to the invention has a hardness of between 48 and 65 shore D, more preferably of between 50 and 63 Shore D. The hardness according to Shore D is measured at room temperature with a method following the instructions of ISO 868. The advantage of a material with such hardness is that a good balance is offered between mechanical strength and flexibility of the conduit, especially at ambient temperatures around room temperature.

Preferably, the thermoplastic elastomer in the process according to the invention and in the mono-layer of the fluid conduit according to the invention has a heat resistance of at least 1000 hr and even more preferred at least 2500 hr.

Preferably, the thermoplastic elastomer in the process according to the invention and in the mono-layer of the fluid conduit according to the invention has a melt flow rate (MFR) measured at 230° C. under a load of 10 kg (MFR 230° C./10 kg), according to ISO1133 (2011) of at most 40 g/10 min, preferably at most 30 g/10 min, more preferably at most 25 g/10 min. This provides a fluid conduit which can be easily prepared by blow molding.

Preferably the thermoplastic elastomer in the process according to the invention has a melting temperature measured with DSC, according to ISO 11357-1:1997 under air atmosphere (purge 50 ml/min) using a heating and cooling rate of 20 K/min of at least 180° C., more preferably at least 190° C., most preferred at least 200° C.

The thermoplastic elastomer in the process according to the invention and in the mono-layer of the fluid conduit according to the invention preferably has a modulus of at least 20 MPa at 160° C., more preferably at least 30 MPa at 160° C. The advantage of using a material with higher modulus at elevated temperature is that the conduit can withstand pressures at higher temperatures. Within the context of this application, modulus is understood to mean modulus in strain, as measured with a Dynamic Mechanical Spectrometer (DMS) on a test-sample that is dynamically elongated in a certain temperature range at a frequency of 1 Hz, following ASTM D5026.

Most preferred, the thermoplastic elastomer in the process according to the invention and in the mono-layer of the fluid conduit has a melting temperature of at least 180° C., hardness of between 48 to 65 Shore D, a heat resistance of at least 250 hr at 175° C., an MFR of at most 40 g/10 min and a modulus at 160° C. of at least 20 MPa, as this gives a fluid conduit which combines flexibility, heat resistance, the ability to withstand pressures at elevated temperatures and facilitates preparation by blow molding.

Preferably, the thermoplastic elastomer is a block copolymer elastomer comprising hard segments (a) and soft segments (b). Hard segments (a) may for example be chosen from the group consisting of polyester, polyamide and polyurethane. Soft segments (b) may for example be chosen from the group consisting of aliphatic polyether, aliphatic polyester and aliphatic polycarbonate. The molar mass of the segments, also referred to as blocks, may vary within a wide range, but preferably the molar mass is chosen between 400 and 6000, more preferably between 500 and 4000 g/mol.

Preferably, the hard segments (a) in the block copolymer elastomer is a polyester and are built up of repeating units derived from at least one aliphatic diol and at least one aromatic dicarboxylic acid or an ester thereof. The aliphatic diol contains preferably 2-6 C-atoms, more preferably 2-4 C-atoms. Examples thereof include ethylene glycol, propylene diol and butylene diol. Preferably propylene diol or butylene diol is used, more preferably butylene glycol and most preferred 1,4-butylene diol. Examples of suitable aromatic dicarboxylic acids include isophthalic acid, terephthalic acid, 2,6-naphthalene dicarboxylic acid, and 4,4'-biphenyl dicarboxylic acid. Also very suitable is a mixture of 4,4'-diphenyldicarboxylic acid and 2,6-naphthalenedicarboxylic acid or a mixture of 4,4'-diphenyldicarboxylic acid and terephthalic acid. The mixing ratio between the two carboxylic acids is preferably chosen between 40:60-60:40 on weight basis.

The hard segment is preferably based on polyethylene terephthalate, polybutylene naphthalate, polyethylene naphthalate, polypropylene terephthalate, and in particular on polybutylene terephthalate. The advantages thereof include favourable crystallisation behaviour and a high melting point, resulting in semi-crystalline block copolymer elastomers with good processing properties and excellent thermal and chemical resistance.

Preferably, the soft segment (b) is an aliphatic polycarbonate and is made up of repeating units from at least one alkylene carbonate. Surprisingly, the inventors have found that this soft segment provides a high heat resistance.

Preferably as alkylene carbonate repeating unit is represented by the formula:

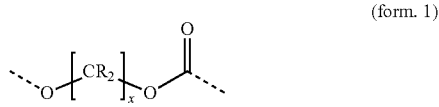

(form. 1)

where R=H and/or alkyl.
X=2-20.

Preferably, R=H, more preferably R=H and x=6 and the alkylene carbonate is therefore hexamethylene carbonate, as this provides high heat resistance and is readily available.

The soft segment (b) may, next to the units from at least one aliphatic carbonate, contain repeating units derived from an aliphatic diol, and an aliphatic dicarboxylic acid or repeating units derived from a lactone.

The thermoplastic elastomer may next to soft segments b) also contain soft segments c) derived from an aliphatic diol and an aliphatic dicarboxylic acid. The aliphatic diol used in b) and c) is preferably an alkylene diol containing 2-20 C atoms, more preferably 3-15 C atoms in the chain. The aliphatic dicarboxylic acid used in b) and c) is preferably an alkylene dicarboxylic acid containing 2-20 C atoms, preferably 4-15 C atoms in the chain. Preferably c) contains butylene adipate as repeating unit.

The thermoplastic elastomer may next to soft segments b) also contain soft segments d) derived from a lactone. The lactone used in b) and d) is preferably polycaprolactone.

The contents of hard segments and soft segments may vary within wide limits and are primary determined by the desired mechanical properties. Thermoplastic elastomers having a high content of hard segments have a greater rigidity and higher melting point. On the other hand thermoplastic elastomers having a low content of hard segments are much more flexible and have a lower melting point. The weight ratio between hard segments and soft segments in the thermoplastic elastomer may vary between 20:80 and 90:10, preferably between 30:70 and 80:20.

The hard segments being preferably a polyester and the soft segments may suitably be bonded via ester bonds to form copolyester units and said copolyester units being joined to one another by (e) a urethane group having the formula:

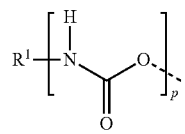

Where $R^1$=an alkyl, aryl or aralkyl group and p=2 or 3.

The content of the urethane group (e) is usually between 2 and 7 wt. % based on the total of the thermoplastic elastomer.

Usual diisocyanates used to form the urethane group are inter alia paratoluene diisocyanate, diphenylmethane diisocyanate (MDI), xylene diisocyanate, hexamethylene diisocyanate and isophorone diisocyanate.

Preparation of the precursor thermoplastic elastomer is for instance described in EP-A-0846712 and a suitable preparation method may contain the steps of:

1. reacting polyester hard segment a) with an aromatic dicarboxylic acid, an aliphatic polycarbonate diol segment b) and if desired an aliphatic polyester segment c) and/or a polylactone segment e) with one another in the presence of a catalyst at elevated temperature for a limited period of time, while removing any volatile reaction products formed.
2. Deactivating the catalyst at least partially.
3. Adding a difunctional and/or a trifunctional isocyanate to block the copolyester under 1 and continuing the reaction.

After step 3, the process may further comprise a solid state-post reaction step in which the molecular weight is increased while keeping the temperature below the melting temperature of the polymer.

Prior to the solid state post-reaction the precursor thermoplastic elastomer may be subjected to a compounding step. Additives mixed with the precursor thermoplastic elastomer may be antioxidants, dyes or pigments, UV absorbers, hydrolytic stabilizers, anti-static agents, fillers, lubricants etc. Between 0.1 and 5 parts by weight of the additives at 100 parts by weight of the precursor thermoplastic elastomer may be added. The compounding step may be carried out by dry blending followed by extrusion. It is also possible that additives are added during the solid state post-reaction to stick to the particles of the thermoplastic polymer or to be absorbed by the particles.

The thermoplastic elastomer is, preferably after the compounding step, subjected to a solid state post-reaction at a temperature between 140° C. and 170° C., preferably above 150° C. and preferably below 165° C., more preferably below 160° C. The solid state post-reaction may be carried out between 4 and 32 hours, preferably between 12 and 24 hours. Normally the post-reaction is carried out on particles of the thermoplastic polymer, suitably on pellets.

The post-reaction of the polymer composition according to the present invention may be carried out by any mode and in any apparatus suitable for that purpose. The process can suitably be carried out, for example, as a batch process (e.g. in a tumble dryer) or as a continuous process (e.g. in a moving bed reactor).

The solid state post-reaction is preferably performed until the thermoplastic elastomer has an MFR measured at 230° C. under a load of 10 kg (MFR 230° C./10 kg), according to ISO1133 (2011) of at most 40 g/10 min, preferably at most 30 g/10 min, more preferably at most 25 g/10 min.

The thermoplastic elastomer may further contain customary additives, like stabilisers, anti-oxidants, colorants, processing aids or flame retarding compounds. The thermoplastic elastomer may also be a mixture of two or more block copolyesters of different compositions, or a blend of a block copolyester and another polymer compatible therewith, like polybutylene terephthalate.

A preferred embodiment is a fluid conduit comprising a mono-layer comprising a thermoplastic elastomer in an amount of at least 80 wt % with respect to the total weight of the mono-layer, wherein the fluid conduit has a heat resistance of at least 250 hours at 175° C. and wherein the thermoplastic elastomer has an melt flow rate measured at 230° C. under a load of 10 kg (MFR 230° C./10 kg), according to ISO1133 (2011) of at most 40 g/10 min, wherein the thermoplastic elastomer is a block copolymer elastomer comprising a polyester as hard segment and a soft segment being an aliphatic polycarbonate which aliphatic polycarbonate is made up of repeating units from at least one alkylene carbonate represented by the formula:

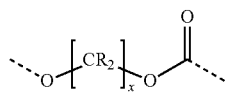

(form. 1)

where R=H and/or alkyl.
X=2–20; and preferably where R=H, more preferably wherein R=H and X=6.

Examples

Test Methods:

The melting temperature was measured with DSC, according to ISO 11357-1:1997 under air atmosphere (purge 50 ml/min) using a heating and cooling rate of 20 K/min.

The melt flow rate (MFR) was measured according to ISO 1133 (2011) at 230° C. under a load of 10 kg.

Elongation at break of the materials were measured at a specific temperature on tensile bars type 1BA, punched out from an injection moulded plate perpendicular to the flow direction of moulding, according to ISO 527 with a test speed of 50 mm/min (ISO527-2/1BA/50). Elongation at break of fluid conduits were measured at a specific temperature on tensile bars type 1BA cut from the fluid conduit.

Heat resistance is defined as the time until which the elongation at break remains above 100%.

Modulus was measured by a Dynamic Mechanical Spectrometer (DMS) on a test-sample that was dynamically elongated at a temperature range at a frequency of 1 Hz, following ASTM D5026. The values are provided at a temperature of 160° C.

Hardness according to Shore D was measured at room temperature with a method following the instructions of ISO 868.

Test samples were prepared by injection molding a plate of the material of 2 mm thick. Subsequently a test bar (type 1BA) was punched out of the injection molded plate, perpendicular to the flow direction during molding. These test bars represent the material as present in a fluid conduit prepared by the process according to the invention.

Materials Used

Material 1 is a block copolyester elastomer of hardness shore D 61, modulus at 160° C. of 71 MPa, MFR (230° C., 10 kg) of 22.7 and melting point of 211° C., based on 72 wt % polybutylene terephthalate hard blocks and 28 wt % hexamethylene carbonate soft blocks. Elongation at break (%) during ageing at 175° C. is given in Table 1.

Material 2 is a block copolyester elastomer of hardness shore D 52, modulus at 160° C. of 35 MPa, MFR (230°, 10 kg) of 14.5 and melting point of 205° C., based on 65% polybutylene terephthalate hard blocks and 35% hexamethylene carbonate soft blocks.

Material 3 is a block copolyester elastomer of hardness shore D 55, modulus at 160° C. of 42 MPa, MFR (230° C., 2.16 kg) of 8.6 and melting point of 206° C., based on 64.8 wt % polybutylene terephthalate hard blocks and 35.2 wt % Poly Butylene Adipate soft blocks. Elongation at break (%) during ageing at 175° C. is given in Table the table 1.

Material A is a block copolyester elastomer of hardness shore D 55, modulus at 160° C. of 86 MPa, MFR (230° C., 10 kg) of 2.9 and melting point of 220° C., based on 70 wt % polybutylene terephthalate hard blocks and 30 wt % ethylene oxide-terminated poly(propylene oxide)diol, comprising about 30 mass % of ethylene oxide soft blocks. Elongation at break during ageing @ 175° C. was measured and is present in Table 2.

Material B is a block copolyester elastomer of hardness shore D 50, modulus at 160° C. of 30 MPa, MFR (230° C., 10 kg) of 2 and melting point of 202° C., based on 67.5 wt % polybutylene terephthalate hard blocks and 32.5 wt % ethylene oxide-terminated poly(propylene oxide)diol, comprising about 30 mass % of ethylene oxide soft blocks. Elongation at break during ageing @ 175° C. was measured and is present in Table 2.

Material C (Hytrel 4275) comprises a block copolyester elastomer of hardness shore D 52, modulus at 160° C. of 23 MPa, MFR(230° C., 10 kg) of 6 and melting point of 192° C., based on 64 wt % polybutylene terephthalate hard blocks and 36 wt % polytetrahydrofuran soft block. Elongation at break during ageing @ 165° C. was measured and is present in Table 3.

Material D (Hytrel 8441) comprises a block copolyester elastomer of hardness shore D 52, modulus at 160° C. of 41 MPa, MFR(230° C., 10 kg) of 10 and melting point of 211° C. based on 66 wt % polybutylene terephthalate hard blocks and 34 wt % ethylene oxide-terminated poly(propylene oxide)diol, comprising about 30 mass % of ethylene oxide soft blocks. Elongation at break during ageing @ 165° C. was measured and is present in Table 3.

Material E (Hytrel 8797) comprises a block copolyester elastomer, modulus at 160° C. of 41 MPa, melting point of 215° C., which copolyester elastomer is based on 66 wt % polybutylene terephthalate hard blocks and 34 wt % ethylene oxide-terminated poly(propylene oxide)diol, comprising about 30 mass % of ethylene oxide soft blocks. Elongation at break during ageing @ 165° C. was measured and is present in Table 3.

TABLE 1

Elongation at break at 175° C.; materials for a fluid conduit according to the invention

| Time (hrs) | Material 1 | Material 2 | Material 3 |
|---|---|---|---|
| 0 | 639 | 650 | 650 |
| 250 | 504 | 646 | |
| 300 | | | 480 |
| 500 | 398 | 414 | 415 |
| 2000 | 216 | 280 | |
| 2135 | | | 230 |
| 3000 | 68 | 193 | 150 |

Material 1 thus has a heat resistance at 175° C. of at least 2500 hours and material 2 has a heat resistance of more than 3000 hours. Material 3 has a heat resistance of more than 3000 hours.

TABLE 2

Comparative data Elongation at break at 175° C.

| Time (hrs) | Material A | Material B |
|---|---|---|
| 0 | 640 | 670 |
| 24 | 551 | 537 |
| 100 | 376 | 297 |
| 250 | 6 | 7 |

Both material A and B showed a heat resistance of less than 250 hours and are thus unsuitable for a fluid conduit according to the invention.

TABLE 3

Comparative data Elongation at break at @ 165° C.:

| Time (hrs) | Material C | Material D | Material E |
|---|---|---|---|
| 0 | 622 | 532 | 527 |
| 200 | 81 | 23 | 327 |
| 500 | 0 | 0 | 0 |

The heat resistance of material C, D and E was measured at 165° C. At this temperature the time to reach 100% elongation at break was below 200 hrs for C and D and between 200 and 500 hours for E. This means that at 175° C. the heat resistance performance of material C and D will be even shorter, i.e. the time to reach 100% elongation at break will be shorter than 200 hrs.

The decrease in elongation at break of material E at 165° C. was very similar to the decrease of elongation at break of materials A and B. Since materials A and B have a heat resistance (time to reach 100% elongation at break) at 175° C. shorter than 250 hrs, the heat resistance of material E (time to reach 100% elongation at break) at 175° C. is also shorter than 250 hrs.

Surprisingly, material 1 and 2 and 3 exhibited a high heat resistance in combination with an MFI of at most 40, which makes these materials highly suitable for blow molding of a fluid conduit. Comparative material A and B clearly showed a much lower heat resistance, which makes them unsuitable for application in a fluid conduit for high temperature applications. Also comparative materials C to E did not show a sufficient heat resistance.

Air ducts were prepared by blow molding material 1 and 2. Similar heat resistance was observed for these air ducts, when a test bar type 1BA was cut from the air duct and elongation at break was measured at a temperature of 175° C.

The invention claimed is:

1. A process for preparing a fluid conduit comprising a mono-layer comprising a thermoplastic elastomer in an amount of at least 80 wt % with respect to the total weight of the mono-layer, comprising at least the following steps:
   (a) melting a composition comprising at least a thermoplastic elastomer, wherein the thermoplastic elastomer has a melt flow rate measured at 230° C. under a load of 10 kg (MFR 230° C./10 kg), according to ISO1133 (2011) of at most 40 g/10 min and having a heat resistance of at least 250 hours at 175° C. at which the elongation at break remains at least 100% as measured according to ISO 527 with a test speed of 50 mm/min to thereby form a melt of the composition, and wherein the thermoplastic elastomer comprises:
      (ii) hard segments selected from the group consisting of polyester, polyamide and polyurethane, and
      (ii) soft segments selected from the group consisting of aliphatic polyether, aliphatic polyester and aliphatic polycarbonate; and wherein
      the hard and soft segments are present in a ratio of the hard segments to the soft segments of between 20:80 and 90:10;
   (b) forming a parison from the melt of the composition;
   (c) placing the parison in a mold;
   (d) blowing-up the parison against the mold; and
   (e) cooling down the mold to thereby obtain the fluid conduit comprising the mono-layer.

2. The process according to claim 1, wherein step (c) comprises placing the parison in a mold by drawing the parison through the mold by reduced pressure or by clamping the parison in the mold.

3. The process according to claim 1, wherein the soft segments comprise an aliphatic polycarbonate made up of repeating units from at least one alkylene carbonate.

4. The process according to claim 3, wherein the alkylene carbonate repeating units are represented by formula 1:

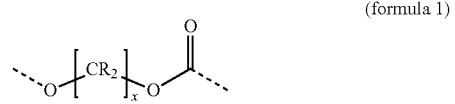

(formula 1)

where R=H and/or alkyl, and X=2–20.

5. The process according to claim 4, wherein R=H and X=6.

6. The process according to claim 3, wherein the hard segments comprise a polyester.

7. The process according to claim 1, wherein the mono-layer comprises at least 90 wt % of the thermoplastic elastomer with respect to the total weight of the mono-layer.

* * * * *